(12) United States Patent
Ferraro

(10) Patent No.: US 7,327,272 B2
(45) Date of Patent: Feb. 5, 2008

(54) APPARATUS FOR DETERMINING AND/OR MONITORING A PROCESS VARIABLE

(75) Inventor: Franco Ferraro, Schwörstadt (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 141 days.

(21) Appl. No.: 11/139,644

(22) Filed: May 31, 2005

(65) Prior Publication Data
US 2006/0267784 A1 Nov. 30, 2006

(51) Int. Cl.
*G08B 21/00* (2006.01)
(52) U.S. Cl. .................. 340/612; 340/618; 340/612
(58) Field of Classification Search ............... 340/612, 340/616, 618, 620, 602, 603, 606
See application file for complete search history.

(56) References Cited
U.S. PATENT DOCUMENTS 5,032,794 A * 7/1991 Ridd et al. ................. 324/365
5,539,670 A * 7/1996 Maltby et al. ............... 702/55
6,218,948 B1 * 4/2001 Dana ........................... 340/604
6,456,202 B2 * 9/2002 Johannsen et al. .......... 340/623
6,828,912 B2 * 12/2004 Kelly .......................... 340/612

* cited by examiner

*Primary Examiner*—Anh V. La
(74) *Attorney, Agent, or Firm*—Bacon & Thomas, PLLC

(57) ABSTRACT

An apparatus for determining and/or monitoring at least one process variable of a medium in a container. The apparatus has at least one mechanically oscillatable unit unit which produces a measurement signal at least dependent on the process variable. It also has at least one electronic unit which evaluates the measurement signal, and at least one function test unit associated with the electronics unit. The measurement signal passes through the electronics unit on at least one processing path, and the function text unit operates on the processing path during a function test in such a manner that a test measurement signal results from the measurement signal received by the electronics unit. The test measurement signal corresponds essentially to the measurement signal, which occurs for a predetermined value of the process variable.

10 Claims, 1 Drawing Sheet

APPARATUS FOR DETERMINING AND/OR MONITORING A PROCESS VARIABLE

FIELD OF THE INVENTION

The invention relates to an apparatus for determining and/or monitoring at least one process variable of a medium in a container. The apparatus includes: at least one mechanically oscillatable unit, which produces a measurement signal at least dependent on the process variable; and at least one electronics unit, which evaluates at least the measurement signal, with the measurement signal passing through the electronics unit on at least one processing path. Examples of the process variable are fill level, density, viscosity, flow rate, temperature, electrical conductivity or pH of the medium. The medium can be, for example, a liquid or a bulk good.

BACKGROUND OF THE INVENTION

In the state of the art, it is known to evaluate the oscillations of mechanically oscillatable units for determining and/or monitoring the fill level of a medium. To this end, for example, a tuning fork with two fork tines, or, for example, a single rod, is excited to oscillate mechanically. When there is coupling between the fork and the medium, characteristics of the oscillations change: the amplitude decreases, the frequency becomes smaller, or a phase shift occurs. In each case, this is in comparison to free oscillations, i.e. in comparison to oscillations, with which the fork oscillates when it is free of contact with the medium. If, for example, the amplitude of the oscillations becomes smaller, this means that the medium is in contact with the tuning fork and that the medium has reached a fill level dependent on placement and construction of the tuning fork. If, in contrast, the amplitude becomes greater, then the fill level of the medium lies again beneath the level, whose reaching was previously indicated by the measuring device. This monitoring of the exceeding and subceeding (falling beneath) of a fill level permits application for so-called min or max protection, e.g. protection against running empty or protection against overflow. Particularly because of this monitoring function, such measuring devices are also referred to as switches.

The switches serve usually for safety, i.e. that overfilling does not occur, or that pumps do not run empty. Therefore, checks must be made, from time to time, on whether the measuring-devices/switches are functioning reliably. For this purpose, function tests are provided.

SUMMARY OF THE INVENTION

An object of the invention is to implement a function test of a limit level switch.

The object of the invention is achieved by the following features: At least one function test unit is provided, which is associated with the electronics unit; the function test unit operates on the processing path during a function test in such a manner that a test measurement signal results from the measurement signal received by the electronics unit; and the test measurement signal essentially corresponds to the measurement signal which arises in the case of a predetermined value of the process variable. In an embodiment, the function test unit is a component of the electronics unit. The invention thus displays the following attributes, that the processing path, which the measurement signal follows in the electronics unit, is adjusted or influenced in such a manner that a test measurement signal results from the measurement signal. Thus, at least one characteristic of the measurement signal is changed, or the measurement signal has superimposed on it a further signal. The test measurement signal is, in such case, so formed, that it equals the measurement signal which results in the case of a predetermined value of the process variable. In this way, the electronics unit has a well defined signal to evaluate or process further. Depending on how the test measurement signal is evaluated, or which process variable is determined therefrom, it can thus be ascertained, whether the measuring device is functioning reliably. If deviations arise between the predetermined value for the process variable and the value determined from the test measurement signal, then this can be attributed at least to three different causes: It can be, that the function test unit is not functioning correctly, it can be, that the evaluation is not functioning correctly, or it can be, that the units or components of the processing path, on which the function test unit operates, are not functioning correctly. The advantage is that the entire signal chain of the electronics, i.e. the entire measuring device, is checked, with partial exception of the piezoelectric element, i.e. the driver/receiver unit (at least a measurement signal must be produced by the driver/receiver unit, which is different from the test signal). In this way, even errors in the end stage can be recognized, when e.g. a relay does not switch. A further advantage is that, during the function test, no additional signal path or other, additional components enter, since the present and, consequently, also error-prone components of the electronics are directly worked with. In any case, a deviation shows that an error has arisen. Encompassed by the term "electronics unit" is, in such case, the electronic unit, which at least evaluates the measurement signals and, in most cases, also supplies the measurement signal to the mechanically oscillatable unit and, thus, contributes to an active feedback.

The function test of the invention utilizes an existing measurement signal applied to the measuring device in such a manner that it is transformed by measures applied to the processing path into a test measurement signal. Alternatively, it is possible to directly inject a test signal into the electronics unit. I.e., it is essential for the invention, that a measurement signal a measurement signal be applied, when the error-free state is to be indicated.

Essential advantages of the invention are, thus, the following: The test path is identical with the function, or processing, path, i.e. the path to be checked is not changed by the adding, or subtracting, of components, or the like. Additionally, a simulated attainment of a value of the process variable, and the subsequent retreat from this value, are possible. E.g. the reaching of a fill level is introduced and, subsequently, the return to free oscillations is made to transpire. Furthermore, the electronics is completely checked in the case in which a fixed sequence of measured values is specified. In the above example, this is: free—covered—free. Furthermore, by the studied introduction of measured values, also drifts of the components, which arise, for example, due to aging, can be identified.

BRIEF DESCRIPTION OF THE DRAWINGS

The invention will now be explained in greater detail on the basis of the drawings, the FIGURE of which shows as follows.

DESCRIPTION OF THE PREFERRED EMBODIMENTS

Figure 1:
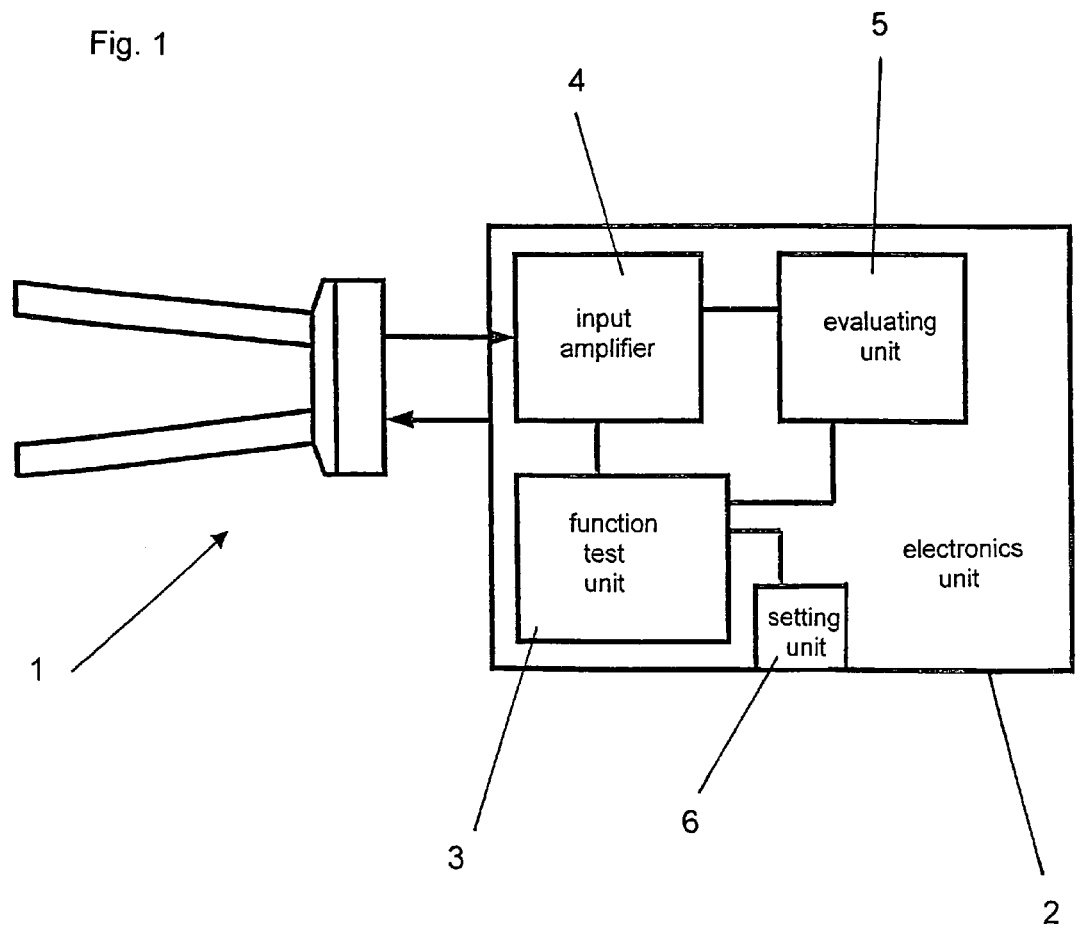
FIG. 1 a schematic representation of an apparatus of the invention.

An embodiment provides that the function test unit executes the function test, when the process variable differs from the value of the process variable predetermined for the function test. In an embodiment, the function test is only executed, when the process variable differs from the predetermined value. For example, if the measuring device is a switch, then the function check can be most simply put into practice by having the user participate in its execution directly on site. For instance, if there are only two switch states, namely free or covered, then the test is, for example, initiated, when the tuning fork is oscillating freely. The predetermined value for the process variable would be, in this case, covered tuning fork, i.e. the medium has reached the fill level associated with this case. The apparatus receives, consequently, the measurement signal for a free oscillation. The function test unit influences the processing path in a manner such that, as test measurement signal, a signal results, which is associated with the described fill level. If the electronics unit is functioning faultlessly, then the apparatus shows the reaching of the fill level. Following the test, the display changes back to "free". This can be checked by the user directly at the measuring device. It is, consequently, sensible only to perform the test, when the existing process variable is different from the predetermined value, since then a change is usable as indicator that the test has been passed. If the fork is covered, and, consequently, the oscillation amplitude is almost zero, then it is only with difficulty that a trustworthy statement can be made concerning the function test in the case of a reduction of the amplification. For the function test in the case of covered fork, it would, therefore, be necessary to increase the amplification sufficiently that a signal results as in the case of free fork. Problematic with this, however, is that therewith also signals from unwanted vibrations become correspondingly strongly amplified.

An embodiment provides that at least one settings unit is provided, via which it is adjustable under which conditions the function test unit executes the function test. The apparatus is, consequently, embodied in a manner such that the function test represents an optional possibility and can, therefore, be turned off, or not activated. For this, configuration switches or a sensor-EEPROM can be provided.

An embodiment provides that the process variable is the fill level of the medium. Fill level is a very common process variable, which is determined and/or monitored with the above-described measuring devices. In addition to fill level, also other process variables can be monitored. In the case of these additional process variables, such as viscosity or density of the medium, it is, however, mostly necessary, that the medium covers the oscillatable unit—for example tuning fork or single rod.

An embodiment provides that the predetermined value of the process variable for the test measurement signal is a fill level height, at which the mechanically oscillatable unit is covered by the medium. An opportunity already discussed above for application of the measuring devices is to employ them as protection against overfilling. That means that primarily the reaching, or exceeding, of a fill level is detected. If a function test is performed with such a value, then the following embodiment is connected therewith in the context of the above-described embodiments.

An embodiment connected with the previous embodiment provides that the function test unit performs the function test, when the mechanically oscillatable unit is freely oscillating. Preferably, the function test is only performed, when the mechanically oscillatable unit is oscillating freely, i.e. not covered by medium. This is connected with the above value for the function test, so that, between the applied measured signal and the test measurement signal to be produced therefrom, a difference obtains, which results from the execution of the function test.

An embodiment provides that the function test unit adjusts the amplification of the measurement signal on the processing path during the function test. Adjustment of amplification provides an opportunity to process the measurement signal in a manner such that the required test measurement signal results. In the case, for example, in which a bulk goods is being monitored as the medium, a lessening of the oscillation amplitude usually accompanies a covering of the oscillatable unit by the medium. Therefore, the test measurement signal can be produced for the state "covered" from the current measurement signal by appropriately lessening the amplification of appropriate units, or components, of the electronics unit. This embodiment is significant, when amplitude of the measurement signals is being evaluated.

An embodiment provides that the function test unit adjusts the amplification of an input amplifier of the electronics unit during the function test essentially to zero. This embodiment is makes sense for the case in which amplitude is being evaluated and the value predetermined for the function test is associated therewith, with the amplitude being strongly decreased, i.e. the oscillations are, for example, stopped, by the covering. In addition to the amplification of the input amplifier, it can, however, also be provided that the function test unit accesses other components of the electronics unit and e.g. influences the frequency of the measurement signal.

An embodiment provides that the function test unit is implemented at least partially as a software unit. The function test unit thus does not have to be an electronics unit, or hardware, but, can, instead, be a (software-)program, which appropriately accesses the electronics unit and executes the function test.

An embodiment includes that the function test unit is located in a microcontroller. The microcontroller is advantageously connected with appropriate digital components in the electronics unit, for adjusting these suitably during the function test. The function test unit is, consequently, in one embodiment, at least a component of a microcontroller or microprocessor. In an embodiment, the function test unit is the program described in the above software embodiment; this program suitably runs, or is executed, in, or on, a microcontroller. Thus, the function test unit is a piece of software(-code), which is stored in the microcontroller and executed by such. Such a microcontroller is, for example, already provided in the measuring device for the control of the measuring device and/or for evaluating the measurement signal. In one embodiment, an analog/digital converter or a comparator circuit or an appropriate sampling unit, which samples the change of the processing path brought-about by the function test unit (e.g. adjustment of amplification) and feeds information obtained by the sampling to the function test unit, or to a unit concerned with evaluation of the function test. In this way, the reaching of a fill level can be simulated and, from that, it can be determined, at which setting of the electronics, e.g. at which amplifier setting, the signal "covered" is transmitted to the end stage. In this way, also the hysteresis of "free" following "covered" can be measured.

An embodiment provides that the function test unit checks whether the value of the process variable determined by the electronics unit during the function test is essentially equal to the predetermined value. In this embodiment, no monitoring by the user or by corresponding service personnel is required. The function test unit thus works independently and itself evaluates the test.

FIG. 1 is a schematic representation of a measuring device of the invention. The mechanically oscillatable unit 1 is, in this case, a so-called tuning fork, which is secured on a membrane, or diaphragm. The two tines of the fork are excited by a transducer unit (not shown) to execute mechanical oscillations. The characterizing variables of the oscillations—amplitude, frequency and phase—depend on the process variable to be measured and/or monitored.

If the medium (not shown) is a liquid, then the frequency becomes smaller, when the medium covers the oscillatable unit. In the case of a bulk good, the amplitude of the oscillations changes correspondingly. The phase of the oscillations changes, for example, in the case of changes of the viscosity of the medium. These are only some examples of the dependencies of the oscillations on the medium.

The transducer unit, which excites the oscillatable unit to oscillate and also receives the oscillations, is usually a piezoelectric element, which transforms the mechanical oscillations into an electrical, alternating voltage and which transforms an electric exciter signal into mechanical oscillations.

The measurement signal produced by the transducer unit and, consequently, coming from the mechanically oscillatable unit 1, is fed to the electronics unit 2. The electronics unit 2 evaluates the measurement signal as regards the process variable. Additionally, the electronics unit 2 feeds the measurement signal back to the mechanically oscillatable unit 1 as an exciter signal. For this purpose, the measurement signal is, for example, amplified and shifted in frequency and/or phase. In the electronics unit 2 of this example of an embodiment, there is, first of all, an input amplifier 4. This amplifies the measurement signal and feeds it then to the subsequent electronics. Usually, a frequency filter (not shown) is also provided, which, for example, filters-out unwanted vibrations. In this example, the preamplified measurement signal is fed to the evaluating unit 5 and evaluated there.

According to the invention, a function test unit 3 is present. This unit 3 can be "activated" via a settings unit, e.g. a DIP-switch 6, i.e. the user can set whether the function test is to be executed. This test is, therefore, optional. The function test involves testing the functioning of the electronics unit 2. If, for example, the measuring device is a limit level switch, which is to indicate the exceeding of a fill level predetermined by its structure and its position, and if this limit level is not reached in usual operation, then it can be essential to monitor the ability of the switch to function. Thus, the test answers the question of how the measuring device reacts to the process variable. A special feature of the invention is that the test measurement signal is produced from the measurement signal which is being applied to the electronics unit. For this, the processing path is so adjusted by an influencing of the units or components of the electronics unit participating therein, that the fitting test measurement signal is produced from the measurement signal. In the case that the process variable is the fill level of a bulk good, it is provided, for example, that the test measurement signal equals the signal which occurs upon the reaching of the fill level by the medium. Since, in the case of a bulk good, amplitude is reduced, the amplification of the input amplifier 4 is, therefore, set to zero. As regards the signal path, it then turns out, that, when the function test is executed, the measurement signal is applied to the input amplifier 4, but, behind the input amplifier 4, it is the test measurement signal which passes through the remainder of the processing path and which, consequently, is, in particular, also transferred to the evaluating unit 5.

In an advantageous embodiment, the function test unit 3 is a component of the evaluating unit 5, or the function test unit 3 is a function, or a program, of the evaluating unit 5. This embodiment enables the function test unit 3 to perform the function test independently, including also the evaluation of the test. With this embodiment, it is also then more simply possible to perform a plurality of different function tests having different values. Therefore, it is also possible to check the determining and/or monitoring of more than one process variable. In an embodiment, the function test unit 3 is a non-interacting, or protective, software unit, which is executed by the microprocessor controlling the measuring device and, in this case, serving also as the evaluating unit 5. Therefore, no additional hardware is required. Instead, the evaluating unit 5 just has an additional function in its repertoire. As a result, also no additional connections are required between the components.

The function test will now be explained on the basis of an example as follows. The tuning fork 1 is oscillating freely and not covered by the medium. The measuring signal has, therefore, a high amplitude. The function test unit 3 decreases the amplification factor of the input amplifier 4 during the function test. Consequently, a test measurement signal results, which would result in the case of a tuning fork 1 covered by the medium. The evaluating unit 5 then, in an error-free condition, evaluates the test measurement signal correspondingly as a "covered signal". For the function test as evaluated by a user, the measuring device consequently first shows the state "free", then "covered" and then, advantageously, again "free". The measuring device thus switches, following the function test, back into the normal state. If the function test unit 3 (which, as indicated above, is a software program in an embodiment) itself evaluates the function test, then, for example, also intermediate values or the total switching behavior of the measuring device can be evaluated.

The invention claimed is:

1. The apparatus for determining and/or monitoring at least one process variable of a medium in a container, comprising:
    at least one mechanically oscillatable unit, which produces a measurement signal at least dependent on the process variable;
    at least one electronics unit, which evaluates the measurement signal; and
    at least one function test unit is associated with said at least one electronics unit;
wherein:
    the measurement signal passes through said at least one electronics unit on at least one processing path;
    said at least one function test unit adjusts the amplification of the measurement signal on the processing path during a function test in such a manner that a test measurement signal results from the measurement signal received by said at least one electronics unit; and
    the test measurement signal corresponds essentially to the measurement signal, which occurs for a predeterminable value of the process variable.

2. The apparatus as claimed in claim 1, wherein:
said at least one function test unit executes the function test, when the process variable differs from the value of the process variable predetermined for the function test.

3. The apparatus as claimed in claim 1, further comprising:
at least one settings unit, via which it can be set, whether said at least one function test unit performs the function test.

4. The apparatus as claimed in claim 1, wherein:
the process variable is the fill level of the medium.

5. The apparatus as claimed in claim 4, wherein:
the predetermined value of the process variable for the test measurement signal is the fill level height at which said at least one mechanically oscillatable unit is covered by the medium.

6. The apparatus as claimed in claim 4, wherein:
said at least one function test unit performs the function test, when said at least one mechanically oscillatable unit is freely oscillating.

7. The apparatus as claimed in claim 1, wherein:
said at least one function test unit adjusts the amplification of an input amplifier of said electronics unit essentially to zero during the function test.

8. The apparatus as claimed in claim 1, wherein:
said at least one function test unit is at least partially implemented as a software unit.

9. The apparatus as claimed in claim 1, wherein:
said at least one function test unit is located in a microcontroller.

10. The apparatus as claimed in claim 1, wherein:
said at least one function test unit checks whether the value of the process variable determined by said electronics unit during the function test is essentially equal to the predetermined value.

* * * * *